3,267,031
STABILIZED SILICONE FLUIDS
Fritz A. Buehler, Cherry Hill, N.J., assignor to Socony Mobil Oil Company, Inc., a corporation of New York
No Drawing. Filed Dec. 17, 1963, Ser. No. 331,109
13 Claims. (Cl. 252—18)

The present invention relates to fluid compositions more particularly fluid compositions containing silicones and possessing improved high temperature stability.

Silicone fluids of various types have been known in the art and have found extensive use as lubricants and hydraulic fluids under conditions requiring stability at temperatures at which mineral oils and natural and synthetic esters tend to decompose. Due to the increasing demand for lubricating compositions capable of resisting still higher operating temperatures even the silicones have not been completely satisfactory. Thus, at temperatures of about 600° F. or higher the silicone fluids tend to gel at increased rates so that there is a substantial lessening of the useful life of the fluid.

In an effort to overcome this problem the art has employed chemical additives which act to improve the high temperature stability of the silicone fluids and some additives have been employed which are capable of effecting a marked improvement in the retardation of gel formation in these fluids. Particularly effective additives of this type are exemplified by the iron salts of organic acids such as those described in U.S. Patent 2,445,567.

However, present-day use often requires that the silicone fluids remain stable at higher temperatures than can be attained even using these iron salts.

It has been found according to the present invention that the high temperature stability of silicone fluids stabilized with the iron salts of organic acids can be further improved, and the useful service life of the fluids thereby substantially increased by the use therein of specific additives. These additives are the oxides, hydroxides and carbonates of the metals belonging to Group 2A of the Mendeleeff Periodic Table of The Elements.

It is therefore the main object of the present invention to provide silicone fluids of improved high temperature stability. A further object is to improve the high temperature stability of silicone fluids containing iron salts of organic carboxylic acids. Another object is to provide a method for improving the high temperature stability of iron stabilized silicone fluids.

Other objects of the invention and some advantages thereof will become apparent from the following description.

The silicone-containing fluids which are improved in accordance with this invention are polysiloxanes having units of the general formula,

$$R_nSiO_{4-n/2}$$

wherein $n$ has a value from about 1.1 to about 2.9 and R represents the same or different organyl radicals. Some examples of such organyl radicals are: hydrocarbons including aliphatic groups, e.g., methyl, propyl, pentyl, hexyl, decyl etc., alicyclic groups, e.g., cyclohexyl, cyclopentyl etc., aryl groups, e.g., phenyl, naphthyl etc., aralkyl groups, e.g., benzyl etc. and alkaryl groups, e.g., tolyl, xylyl etc.; the halogenated, oxygen-containing, and nitrogen-containing organyl radicals including halogenated aryl groups, alkyl and aryl ether groups, aliphatic ester groups, organic acid groups, cyanoalkyl groups etc. The organyl radicals, in general, contain from 1 to about 30 carbon atoms.

Of particular interest are polysiloxane fluids containing organo-siloxane units of the above formula wherein R is selected from the group of (a) alkyl radicals, e.g., methyl, (b) mixed alkyl and aryl, e.g., phenyl radicals, in a mol ratio of alkyl to aryl from about 0.5 to about 25, (c) mixed alkyl and halogenated aryl radicals, e.g., chlorinated, brominated phenyl, in a mol ratio of alkyl to halogenated aryl of from 0.5 to about 25 and (d) mixed alkyl, aryl and halogenated aryl radicals in a mol ratio of alkyl to total aryl and halogenated aryl from about 0.5 to about 25; the halogenated aryl radicals in all cases possessing from 1–5 halogen atoms each. These silicone fluids may, of course, also be physical mixtures of one or more of the polysiloxanes in which R is as defined above.

The viscosity of the silicone fluids will vary depending upon the starting materials, their method of preparation etc. In general, the fluids may possess molecular weights of from about 200 upward frequently from about 500 to about 10,000.

Further details as to the preparation and properties of polysiloxanes of the aforementioned type are given, for example, in "An Introduction to the Chemistry of Silicones," E. G. Rochow, Second Edition (1951), published by John Wiley & Sons, and "Organo Silicon Compounds," C. Eaborn (1960), Academic Press, New York.

The iron salts of organic acids which are used as stabilizers for the silicone fluids include the salts of saturated or unsaturated aliphatic, cycloaliphatic, and aromatic carboxylic acids. The acids may be either mono-carboxylic or polycarboxylic. Some examples of such salts include iron acetate, iron propionate, iron butyrate, iron isobutyrate, iron 2-ethyl hexanoate, iron benzoate, iron naphthalate, iron toluate, iron cyclohexanoate, iron oxalate as well as the iron salts mentioned in U.S. Patent 2,445,567. The iron salt of ethyl hexanoic acid is a particularly effective stabilizer of this type.

The amount of iron salt added to the polysiloxanes is generally in the range from about 0.001 to about 10% by weight. As little as about 0.001% will provide significant improvement, while the use of higher amounts is often desirable in some situations in order to allow some loss of this additive, for example, by adsorption and sedimentation under service conditions.

The additives used to further improve the high temperature stability of these iron-stabilized silicone fluids according to the present invention are, as mentioned above, Group 2A metal oxides, hydroxides or carbonates. Thus, the oxides, hydroxides or carbonates of beryllium, magnesium, calcium, strontium, barium and radium may be employed, the compounds of calcium, barium and strontium being preferred. The amount of Group 2A metal compound employed will depend on various factors including the amount of iron salt present, the degree of stability desired etc. In general, amounts ranging from about 0.0001% to about 10% preferably from about 0.001 to 0.1% by weight of the composition are used.

A more complete understanding of the invention will be had by reference to the following specific embodiments and comparative tests.

HIGH TEMPERATURE STABILITY TEST

This test measures high temperature stability by determining (1) the ability of a silicone fluid to remain fluid, i.e., resist gelation at 600° F. in presence of air, and (2) the rate of evaporation of the fluid as indicated by its percent weight lost after certain periods of time. According to the test procedure, a sample of the silicone fluid contained in a Pyrex beaker is placed in an oven and maintained at 600° F. under forced air circulation. The fluidity of the oil is then observed until the sample shows no gravity flow. The time elapsed from the beginning of the test to this point is then recorded as the "gel time" of the sample. After periods of heating, the sample is weighed to obtain its percent weight loss and determine its rate of evaporation.

Example 1

The base fluid used was a methyl-phenyl polysiloxane having a methyl to phenyl molar ratio of 20:1, a molecular weight of about 3500, and a kinematic viscosity at 100° F. of 80 centistokes.

To this base fluid was added 0.25% of iron octoate and 1% of calcium oxide. This composition was subjected to the high temperature gelling test and its "gel time" and percent weight loss recorded. The results are reported in the following Table 1. The test was also conducted on the same silicone fluid containing the iron octoate but no calcium oxide.

TABLE 1.—HIGH TEMPERATURE STABILITY TEST

| Ex. No. | Wt. Percent Iron Salt | Group 2A Compd. | Wt. Percent | Gel Time | Percent Wt. Loss, Hrs. at 600° F. | |
|---|---|---|---|---|---|---|
| | | | | | 10 Hrs. | 500 Hrs. |
| | 0.25 | None | | 550 | 18.6 | 54.6 |
| 1 | 0.25 | CaO | 1.0 | 940 | 17.8 | 50.5 |

It will be seen that the calcium oxide increases the "gel time" of the fluid from 550 to 940 hours and also reduces its weight loss and thus its rate of evaporation.

Examples 2 and 3

The high temperature stability test was conducted on a silicone fluid containing the Group 2A metal compounds of this invention but containing no iron salt. The silicone base fluid used was a methyl-phenyl polysiloxane having a methyl to phenyl molar ratio of 20:1, a molecular weight of about 2500 and a K.V. at 100° F. of 40 centistokes. The results are tabulated in Table 2.

TABLE 2.—HIGH TEMPERATURE STABILITY TEST

| Ex. No. | Wt. Percent Iron Salt | Group 2A Compd. | Wt. Percent | Gel Time | Percent Wt. Loss, 10 Hrs. at 600° F. |
|---|---|---|---|---|---|
| | | None | | 9 | 37.8 |
| 2 | | CaO | 0.9 | 9 | 36.8 |
| 3 | | Ca(OH)$_2$ | 1.0 | 9 | 38.2 |

It will be seen from the above that the addition of the Group 2A metal compound to the silicon fluid produces no improve in "gel time" when an iron salt is absent.

Examples 4–8

Following the procedure of Example 1, a polysiloxane fluid having a methyl to phenyl molar ratio of 8:1, a molecular weight of about 3000, and a K.V. at 100° F. of 65 centistokes is admixed with 0.25% iron octoate and the amounts of various Group 2A metal compounds indicated below. The high temperature stability test is conducted on these compositions and the results reported in Table 3.

TABLE 3.—HIGH TEMPERATURE STABILITY TEST

| Ex. No.[1] | Group 2A Compd. | Wt. Percent | Gel Time | Percent Wt. Loss, Hrs. at 600° F. | |
|---|---|---|---|---|---|
| | | | | 20 Hrs. | 500 Hrs. |
| | None | | 550 | 18.9 | 62.0 |
| 4 | CaO | 0.7 | 900 | 20.2 | 57.5 |
| 5 | Ca(OH)$_2$ | 1.0 | 1,300 | 22.0 | 53.6 |
| 6 | CaCO$_3$ | 1.4 | 900 | 16.5 | 56.0 |
| | None | | 900 | 20.7 | 54.2 |
| 7 | CaO | 4.6 | 1,730 | 19.4 | 45.4 |
| 8 | BaO | 2.7 | 2,400 | 20.3 | 53.3 |

[1] Each composition tested contained 0.25 wt. percent iron octoate.

As will be seen from Table 3, the addition of the Group 2A metal compound to the iron salt-stabilized silicone fluid produces increases in "gel time" ranging from about 163% (550 to 900 hrs., Examples 4 and 6) to about 266% (900 to 2400 hrs., Example 8).

Examples 9 and 10

Following the procedure of Example 1, a polysiloxane having a methyl to phenyl molar ratio of 0.75:1, a molecular weight of about 900 and a K.V. at 100° F. of 230 centistokes, 0.25 wt. percent iron octoate and the Group 2A additives indicated below are admixed and subjected to the high temperature stability test with the following results.

TABLE 4.—HIGH TEMPERATURE STABILITY TEST

| Ex. No.[1] | Group 2A Compd. | Wt. Percent | Gel Time | Percent Wt. Loss 500 Hrs. at 600° F. |
|---|---|---|---|---|
| | None | | 940 | 81.0 |
| 9 | CaO | 1.0 | 1,900 | 73.3 |
| 10 | Ca(OH)$_2$ | 0.8 | 1,225 | 72.9 |

[1] Each composition tested contained 0.25 wt. percent iron octoate.

It will be noted from the foregoing test results that the additives of the present invention when used in combination with the iron salt of an organic acid are surprisingly effective in increasing the high temperature stability of silicone fluids.

The stabilized silicone fluids of this invention may be prepared by blending the silicone fluid, iron salt and Group 2A metal compound in any desired sequence.

The compositions of the present invention may, of course, also contain effective quantities of various additives such as those normally used in lubricating compositions including detergents, rust inhibitors, lubricity improvers, E.P. agents, anti-wear agents, etc. The instant compositions may also contain other lubricants including the copolymeric siloxane and organotin compounds described in U.S. Patent 3,090,754.

As will be appreciated by those skilled in the art, polysiloxane fluids of this invention because of their stability may be advantageously employed in a variety of applications. For example, they may be used per se as lubricants including hydraulic fluids or as blending stocks for petroleum and synthetic lubricating oils and greases to improve the high temperature stability of these latter materials. These stabilized silicones may also be advantageously employed as heat transfer fluids or as dielectric media.

Although the present invention has been described and illustrated by reference to certain specific examples and embodiments, it will, of course, be understood that it is not limited thereto, and that suitable modifications may be practiced without departing from the scope and spirit of this invention.

Having thus described the invention, what I desire to secure and claim by Letters Patent is:

1. A composition comprising a high temperature-stabilized polysiloxane fluid having the unit formula:

$$R_nSiO_{4-n/2}$$

wherein $n$ has a value from about 1.1 to about 2.9 and R represents a radical selected from the group consisting of a hydrocarbyl radical and a halohydrocarbyl radical containing from 1 to about 30 carbon atoms, said fluid containing a minor proportion of at least 0.001% by weight of an iron salt of a carboxylic acid and a minor proportion sufficient to stabilize said fluid of a metal compound selected from the class consisting of the oxides, hydroxides and carbonates of the metals from Group 2A of the Mendeleeff Periodic Table.

2. The composition of claim 1 where said Group 2A metal compound is a compound of calcium.

3. The composition of claim 1 wherein said Group 2A metal compound is a compound of barium.

4. The composition of claim 1 wherein said Group 2A metal compound is a compound of strontium.

5. The composition of claim 1 wherein said Group 2A metal compound is calcium oxide.

6. The composition of claim 1 wherein said Group 2A metal compound is calcium hydroxide.

7. The composition of claim 1 wherein said Group 2A metal compound is barium oxide.

8. The composition of claim 1 wherein said Group 2A metal compound is present in an amount from about 0.0001 to about 10% by weight.

9. The composition of claim 1 wherein said Group 2A metal compound is present in an amount from about 0.001 to about 0.1% by weight.

10. A composition comprising a high temperature-stabilized polysiloxane fluid having the unit formula:

$$R_n SiO_{4-n/2}$$

wherein $n$ has a value from 1.1 to 2.9 and R is selected from the group consisting of (a) alkyl radicals, (b) mixed alkyl and aryl radicals in a mol ratio of alkyl to aryl of from about 0.5 to about 25, (c) mixed alkyl and halogenated aryl radicals in a mol ratio of alkyl to halogenated aryl of from about 0.5 to about 25 and (d) mixed alkyl, aryl and halogenated aryl radicals in a mol ratio of alkyl to total aryl and halogenated aryl of from about 0.5 to about 25, said halogenated aryl radicals in all instances containing from 1 to 5 halogen atoms each, R containing from 1 to about 30 carbon atoms, said fluid containing from about 0.001 to about 10% by weight of an iron salt of a carboxylic acid selected from the group consisting of aliphatic, cycloaliphatic and aromatic carboxylic acids and from about 0.001 to about 10% by weight of a metal compound selected from the class consisting of the oxides, hydroxides and carbonates of the metals from Group 2A of the Mendeleeff Periodic Table.

11. The composition of claim 10, wherein the iron salt is iron octoate.

12. The composition of claim 10, wherein the metal compound is calcium oxide.

13. The composition of claim 10, wherein the metal compound is calcium hydroxide.

References Cited by the Examiner

UNITED STATES PATENTS

| | | | |
|---|---|---|---|
| 2,445,567 | 7/1948 | Elliot | 252—37.2 X |
| 2,684,944 | 7/1954 | Zajac | 252—25 X |
| 2,911,369 | 11/1959 | Zajac | 252—49.6 X |
| 3,009,877 | 11/1961 | Nielsen | 252—37.2 X |

FOREIGN PATENTS

| | | |
|---|---|---|
| 1,265,438 | 5/1961 | France. |

DANIEL E. WYMAN, *Primary Examiner.*

C. F. DEES, *Assistant Examiner.*